United States Patent [19]

Laing et al.

[11] Patent Number: 4,629,116
[45] Date of Patent: Dec. 16, 1986

[54] POWER SAVING THERMAL CARRIER CIRCULATING PUMP PARTICULARLY FOR HEAT PUMP HEATING SYSTEMS

[76] Inventors: Karsten Laing; Oliver Laing, both of Hofener Weg 37, 7148 Remseck a.N.2, Fed. Rep. of Germany

[21] Appl. No.: 817,778

[22] Filed: Jan. 10, 1986

Related U.S. Application Data

[63] Continuation of Ser. No. 560,744, filed as PCT/DE 83/00052 Nov. 23, 1983, abandoned.

[30] Foreign Application Priority Data

Mar. 23, 1982 [DE] Fed. Rep. of Germany ....... 3210641

[51] Int. Cl.[4] ................................................. F24D 3/00
[52] U.S. Cl. .................................. 237/8 R; 236/9 A; 236/91 F; 318/812; 417/420
[58] Field of Search ............... 417/420; 237/8 R, 2 B; 236/9 A, 46 F, 74 A, 91 F; 318/767, 806, 812

[56] References Cited

U.S. PATENT DOCUMENTS 4,109,639  8/1978  Keegan .............................. 126/421
4,352,646 10/1982  Laing et al. ........................ 417/420

FOREIGN PATENT DOCUMENTS

3032089  3/1982  Fed. Rep. of Germany .... 236/46 F

Primary Examiner—Henry Bennett
Attorney, Agent, or Firm—Hill, Van Santen, Steadman & Simpson

[57] ABSTRACT

An electric-motor-driven circulating pump for heating systems reduces power consumption of the motor, whereby the reduction ensues by means of periodic interruption of a line feed by means of electronic switch means so that switch-on and pause intervals follow one another. The switch means interrupt or close current flow at a zero-axis crossing of the voltage of the line feed.

15 Claims, 10 Drawing Figures

POWER SAVING THERMAL CARRIER CIRCULATING PUMP PARTICULARLY FOR HEAT PUMP HEATING SYSTEMS

This is a continuation of application Ser. No. 560,744, filed as PCT/DE83/00052 Nov. 23, 1983 now abandoned.

BACKGROUND OF THE INVENTION

The invention relates to circulating pumps for flowable thermal or heat carriers in heating systems.

The output of a circulating pump is defined by the product of pressure and quantity. Multiplied by the temperature drop that the thermal carrier experiences in the heating system, the quantity in turn produces the heating capacity transmitted by the thermal carrier. Conventional heating systems function with a high temperature gradient between the forward feed and the runback, consequently requiring relatively low hydraulic circulation capacities. Given heating systems supplied by low-temperature boilers, by heat pumps or by solar collectors, however, the cost of heat is all the lower the lower the forward feed temperature is set, and thus the smaller the temperature gradient is between the forward feed and the runback. Heating systems having such heat sources accordingly function with high volume flows, therefore requiring high hydraulic circulating capacities. The annual power consumption for the circulating pumps given heating systems with energy-saving heat generators is therefore considerably higher than in older systems. The pumps therefore become the critical energy user, this having a particularly deleterious effect given energy-saving heating systems.

The intersection of the pressure/quantity curve of the pump and the resistance characteristic of the system forms the operating point that is displaced toward higher pressures the smaller the system or the higher its resistance.

Heat pumps having pole-change motors are known. Multiple pole change-overs effect a switching of the motor to half its speed as soon as a prescribed temperature in the heating system is downwardly transgressed. These pumps, however, only allow a two-position control with a power jump of 8:1 and require expensive motors.

Pumps having phase controls have also been disclosed. Phase-control operation involves the disadvantage that it generates considerable radio interference and that the motor starting torque decreases proportionally with the working torque, whereby the jeopardy of jamming during start-up increases considerably.

SUMMARY OF THE INVENTION

The invention provides that the motor operation under partial load occurs such that the pump motor is cyclically switched on and switched off. It is thereby assured that the start-up respectively ensues with full voltage, this being of decisive significance given motors having permanent magnetic rotors since such motors otherwise run with high slippage. The switch-on and switch-off should respectively ensue when the line voltage curve intersects the zero line. It is thus assured that no radio and video interference is possible and the capacitor is also protected against impermissably high voltage peaks.

The partial load power is formed by the integral which derives from the start/pause ratio. This ratio is defined as a function of the required heating capacity by means of (a) manually controlled,
(b) temperature-controlled, or
(c) pressure-controlled switch elements.

The re-starting can inventively ensue in such short time intervals that the rotor of the motor does not come to a complete standstill in the pause intervals, so that the operating condition "hydraulic friction" is maintained in the bearing of the pumps, whereby wear phenomena due to half-boundary friction are avoided at the pump bearing. When a control interval corresponding to the heat consumption interval between nominal power and the very low heat consumption on the warmest days of the heating season is, however, to be traversed, then the lower speed no longer suffices for maintaining the hydraulic friction in the cylinder bearings. The invention therefore preferably provides magnetically seated, so-called ball motors as the motor, these functioning wear-free even at the lowest speeds. Motors whose rotors are designed as permanent magnets having a coercive field strength below 350 Oe are particularly favorable.

This control of heat pumps is also suitable for floor heating systems and other large-surface heating systems. Such heating systems are characterized by an extremely high thermal inertia. The switch-on and switch-off as usually practiced in heating technology is not suitable for floor heating. Given switch-on intervals that are too short, the hot thermal carrier would only flood part of the piping laid in the floor. Only a part of the room would consequently be heated. An admixture control must therefore fundamentally replace the quantity control in previous floor heating systems. The disadvantage of an admixture control is that the admixture pump must permanently run, even when only very low heating capacities are still required. A further disadvantage is that motor-driven admixing valves are very expensive and susceptible and lead to an expensive installation. It has become possible as a result of the invention to have a pulsed quantity control replace an admixture control. According to the invention, the pump conveys at least as much thermal carrier water in every instance that all areas of the space to be heated are supplied with heat. The motor runs in continuous duty at the nominal power. The pauses between the working intervals become all the greater the lower the required heating capacity, the intervals between said working intervals thereby depending on the length of the piping network. The flowthrough therefore always ensues with the full pump power, whereby the appearance of greatly divergent temperatures between the forward feed regions and the runback regions of the floor is avoided. The pulsed quantity control is treated below.

DESCRIPTION OF THE PREFERRED EMBODIMENTS

Figure 1:
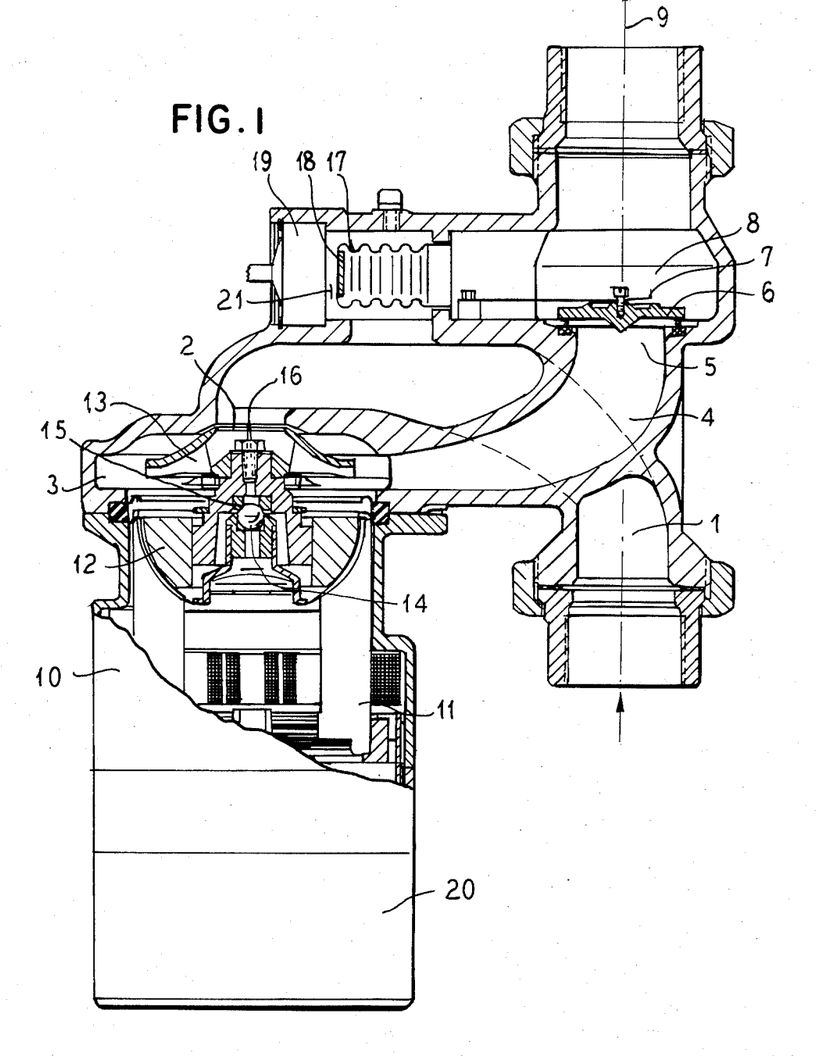
FIG. 1 shows a section through a pump according to the invention.

In section, FIG. 1 shows a pump according to the invention having a motor with a sperical air gap, referred to below as a ball motor. Given this pump, the intake flow leading into the rotor mouth 2 over the channel 1 crosses the output flow that leaves the spiral housing 3 through the discharge channel 4. The conveying stream is then conducted through a valve opening 5 which is kept closed as long as the motor is not operating, being kept closed by a valve plate 6 that is hinged to a spring 7. A discharge 8 is expanded in the area of the valve plate. The conveying stream departs the pump according to arrow 9. Since the motor 10 is perpendicularly disposed with a stator 11 that is downwardly directed, the weight equality between the pole ring region 12 and the paddle wheel 13 relative to the supporting surface between the bearing ball 14 and the step bearing 16 otherwise necessary in ball motors is not required. The discharge 9 is followed by a heating system whose heating elements are equipped with valves actuated by room temperature. A bellows 17 is disposed between the pressure chamber and the suction chamber. With an increasing pressure in the pressure chamber, its floor 18 approaches the proximity switch 19, whereby the electronic switch means in the space 20 effect an interruption of the current for the pump motor 10,11. As soon as the pressure has reached a prescribed level, the diminished gap 21 between the floor 18 and the proximity switch 19 effects an interruption of the current feed. The pressure then decreases again as long as one of the heating valves allows a conveying stream to pass so that the gap 21 increases again and the motor 10,11 is again supplied. The length of the pause interval is defined by the value of the pressure interval between shut-off and renewed switch-on. This pause interval should preferably be kept so small that the rotor/paddle wheel unit 12,13 never comes to a complete standstill except under extreme conditions.

As also shown in FIG. 1, the electric motor 20 comprising a magnetically seated ball motor has a spherical air gap between the stator 11 and the rotor 12. The rotor is supported against the wall of the pump chamber via a ball 14. The rotor 12 and the impeller or paddle wheel 13 form a unit seated in the conveyed medium, and the rotor comprises preferably a permanently magnetic material having a coercive field strength lying below 350 Oe. The ball 14 rests in a cap or seat 15.

Figure 2:
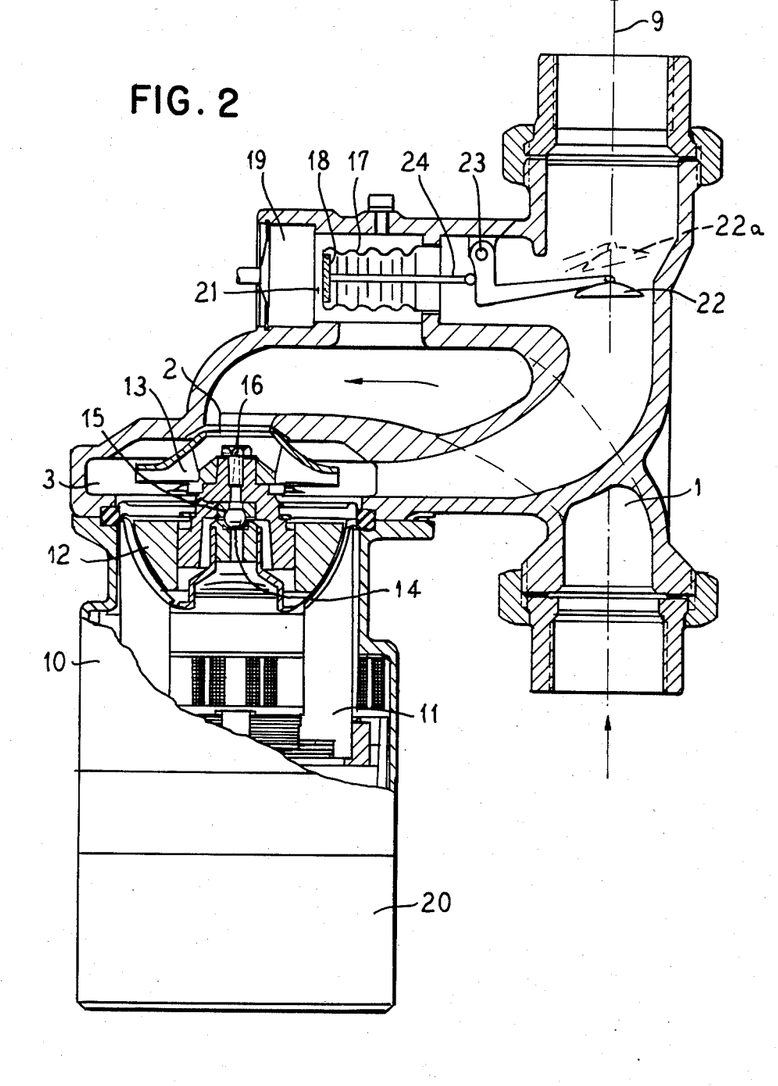
FIG. 2 shows a section through an alternative embodiment of the pump shown in FIG. 1.

FIG. 2 shows a modification of the pump according to FIG. 1, but without a valve. A resistance member 22 which is seated over a lever in the pivot point 23 presses against the diaphragm floor 18 over the rod 24 due to its weight and thus simulates high pressure. Independently from the proximity switch, the switch electronics effects an engagement of the motor 10,11 for only a few seconds at intervals of a few minutes. The resistance member 22 remains in its position when all heating element valves are closed. When, on the other hand, a flow-through of the heating system occurs because heating elements valves have opened, then the resistance member 22 is pivoted into position 22a. Contact with the rod 24 is thus interrupted so that the ratio of the on interval and the pause interval again depends only on the pressure differential based on the proximity switch 18,19 and, thus, on the throttle position of the heating element valves.

Figure 3:
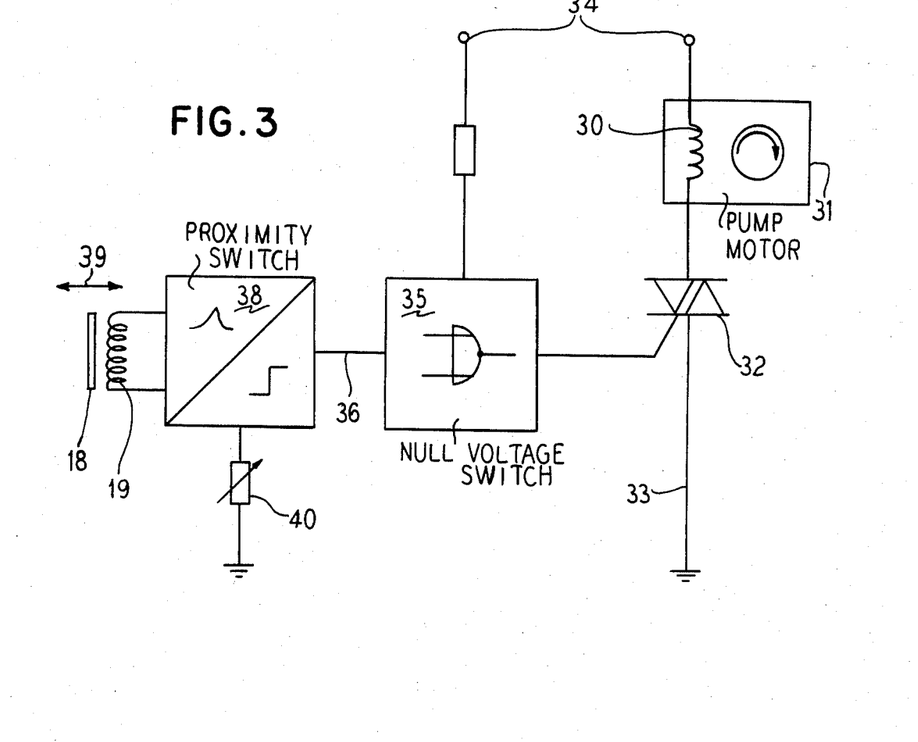
FIG. 3 shows a block diagram.

FIG. 3 shows a block diagram of the inventive pump. The winding 30 of the pump motor 31 is fed with the anode of a triac 32 whose cathode is connected to neutral conductor 33. The power supply for the pump motor 31 is switched on by the triac 32. The drive of the triac 32 ensues by means of a null voltage switch 35 triggered by the mains 34 and driven over the line 36. The control signal is generated in the proximity switch 38 whose coil 19 is attenuated by the approach of the floor 18 such that a digital signal is generated as a function of the attenuation lamina 18 disposed in displaceable fashion in accordance with the double arrow 39. The distance between the coil 19 and the attenuating lamina 18 at which the change-over signal arises can be set by the potentiometer 40. The attenuation lamina 18 is moved by the bellows 17, so that the proximity switch effects a disconnect of the motor 31 over the null voltage switch 35 as soon as the input size of the gap 21 is downwardly transgressed. Since the speed of the motor and, thus, of the paddle wheel now decreases, the pressure quickly decreases as a function of the system resistance so that the motor is again switched on. The null voltage switch 35 causes the re-engagement to occur at the moment at which the voltage curve of the line voltage intersects the zero line.

The switch-on and switch-off ensues at smaller and smaller time intervals the lower the system resistance. This means that a relatively large conveying stream is generated given heating elements that are relatively wide open, whereas the switch-on ensues only for a relatively brief on interval given an increasing system resistance such as occurs, for example, given thermostatically controlled heating element valves when the rated room temperature has been approximately reached. This effects a reduction of the operating speed of the pump motor and, thus, of the paddle wheel. The heating element thermostat valves close completely when the room temperature reaches the rated temperature. The pressure generated by the paddle wheel is thus not dismantled since the clack valve 6 prevents a return flow through the pump. The heat pump, accordingly, remains switched off until the room temperature falls below the rated temperature, whereupon the heating element valves again release a cross-section dependent on the temperature for the throughput of the thermal carrier. In practice, this means that the heat pump remains off during the summer period without a separate shutdown.

The pulses generated by the proximity switch 18,19 can also be generated by a comparator that compares a voltage $U_1$ forming a function of the room temperature or of the forward feed temperature to a voltage $U_2$ corresponding to a triangular voltage generated with corresponding switch means.

Figure 4:
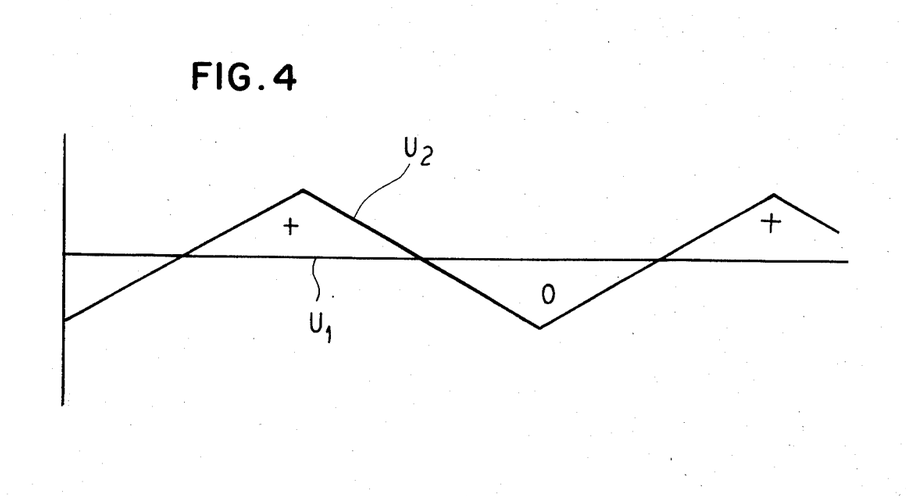
FIG. 4 shows the voltage curve given a specific circuit.

The voltage allocation is shown in FIG. 4. Based on its position relative to the voltage $U_2$, the voltage $U_1$ determines at what time intervals the comparator emits an output signal "+" or "O". This signal proceeds over the line 6 to the null voltage switch 35 which in turn again controls the drive motor 31 over the triac 32. The frequency of $U_2$ should be selected such that a speed reduction is achieved over the moment of inertia of the rotor with attached paddle wheel, said speed reduction not yet leading to periodic standstill given the preferred on/pause ratio. The pump output can thereby be reduced approximately proportional to the heat consumption.

Figure 5:
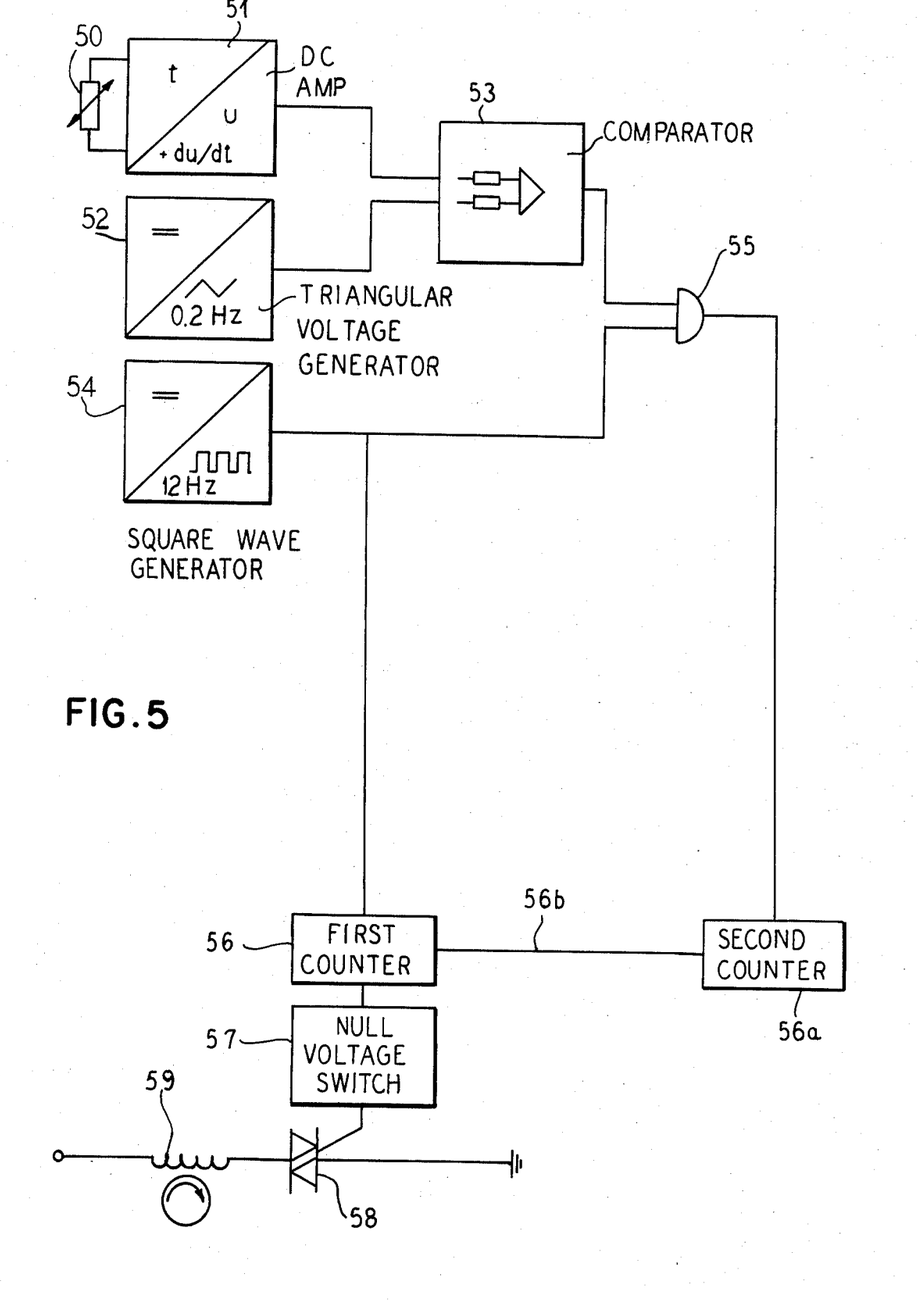
FIG. 5 shows a block diagram with comparator.

FIG. 5 shows the block diagram of a floor heating system. The temperature sensor 50 with following d.c. amplifier 51 converts the thermal signal into an approximately proportional electrical signal. This signal is composed of a voltage that varies approximately proportional to the room temperature and whose gradient du/dt thus represents the rate of temperature change. A triangular alternating voltage is generated in a triangular voltage generator 52, its frequency lying at about 0.2 Hz. These two voltages are compared in the following comparator 53: when the momentary voltage from the triangular generator is greater than the voltage from the d.c. amplifier 51, the comparator emits an output signal "+" having the size of the positive feed voltage. In the opposite case, the output signal is "O", corresponding to the negative feed voltage. A square wave generator 54 generates a clock frequency of, for example, 12 Hz. The pulses proceed, on the one hand, to an AND gate 55 and to a first counter 56. The pulses are counted in said counter, for example up to $2^{12}$ which corresponds to a time of 3 minutes at 12 Hz. The pump motor 59 connected over the null voltage switch 57 and the triac 58 is on during this counting time. The pulses proceeding through the AND gate 55 are incremented in the second counter 56a, this likewise having a counting range of, for example, $2^{12}$. The output 56b of the counter 56a starts the counter 56 at a new running time. The following function thus derives:

A temperature generating, for example, a voltage of half the feed voltage at the output of the d.c. amplifier 51 allows a pulse sequence with 50% "O" and 50% "+" arise after the comparator 53. Only 50% of the counting pulses thus likewise proceed through the AND gate 55 to the counter 56a. This means that this counter 56a needs twice as long to count up to the final count $2^{12}$ as the counter 56. The relative "on" duration of the pump motor 59 thus again amounts to 50% as well An increased voltage at the output of the d.c. amplifier 51 would, for example, effect a pulse/pause ratio of 30:70. Vice versa, a reduction of the voltage of the amplifier 51 leads to a higher pulse/pause ratio. This ratio has become 1:0 at the nominal power, i. e. permanent duty prevails.

Figure 6:
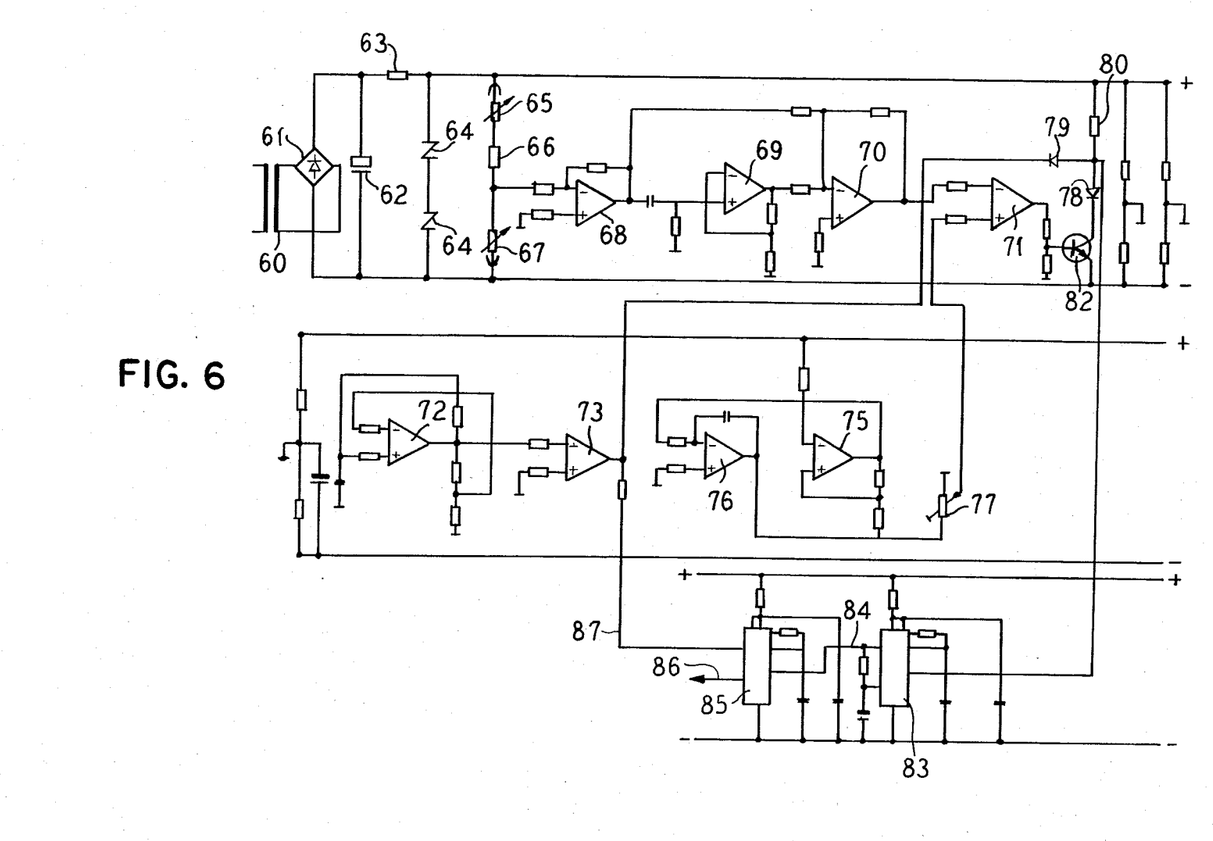
FIG. 6 shows the circuit diagram of FIG. 5.

FIG. 6 shows the circuit diagram of the circuit shown in block diagram in FIG. 5. The feed ensues over the line transformer 60 which, filtered over a rectifier bridge 61 by the capacitor 62 and the drop resistor 63, is stabilized over two Zener diodes 64. Room temperature measured by the PTC resistor is converted into a voltage in the first voltage divider path which consists of a rheostat 65, a drop resistor 66 and a PTC resistor 67, said voltage being equal to half the feed temperature in the case of the rated temperature. Deviations from this half feed voltage are amplified in the following amplifier 68. In the following operational amplifier 69, the output voltage of the operational amplifier 69 is differentiated and again amplified. Both voltages from the amplifiers 68 and 69 are added in the amplifier 70 and are supplied to the negative input path of the following comparator 71.

In the group of generators, the first operational amplifier 72 is a 12 Hz clock generator which is followed by the amplifier 73 as a pulse amplifier. The amplifier 74 is connected to the amplifier 75 to form a delta generator. The output signal of the delta generator proceeds over the potentiometer 77 into the positive path of the comparator 71.

The 12 Hz clock pulses proceed to the AND circuit which is formed by the diodes 78 and 79 and the resistor 80. The same AND circuit is driven by the transistor 82 which is itself driven by the operational amplifier 71. The output signal of this AND circuit proceeds into the counter 83. A start signal proceeds from the counter 83 over the line 84 to the counter 85 which, after it has started, counts the pulses arriving over the line 87 and emits a continuous signal over the line 86 during the counting time over a zero point switch (not shown). After the counting time has elapsed, the current feed to the pump motor is interrrupted until a further start signal has occurred.

Figure 7:
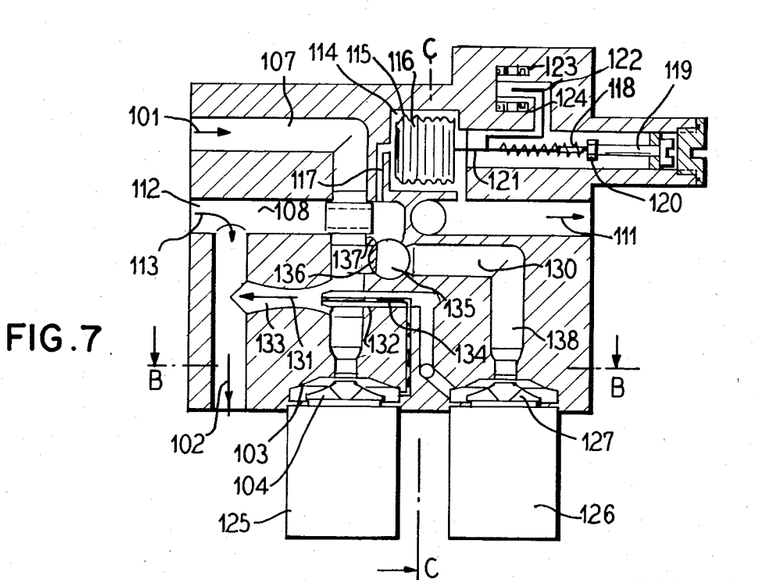
FIG. 7 shows a section through a pump according to the invention.

FIG. 7 shows a main pump according to the invention that forms a unit together with an auxiliary pump, being shown schematically in section, and being connected over the line 101 to the forward boiler feed and over a line 102 to the boiler runback. The pump impeller 104 is situated in the spiral housing 103 of the main pump.

Figure 8:
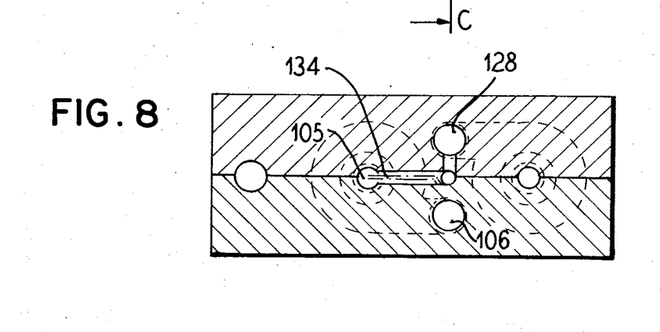
FIG. 8 shows a section through an alternative to FIG. 1.

In FIG. 8, which shows a section through the section line B—B, the intake connector 105 and the discharge connector 106 are visible. The line 107 crosses the line 108 without communicating therewith. The connector 106 can likewise be seen in FIG. 9 which is allocated to the plane of section C—C. The throughput fills the clack valve 109 and proceeds through the Siamese joint 110 into the discharge 111 through which the forward feed water proceeds into the heating system. The runback of the heating element system is connected with the connector 112, so that the runback stream flows to the boiler return 102 according to arrow 113. A diaphragm 115 is disposed in a space 114 which communicates with the line section 111 between the clack valve 109 and the control valves (not shown) of the heating elements. The interior 116 of the diaphragm member 115 communicates over the bore 117 with the runback line 112. The diaphragm member is biassed over a tensioning spring 118. The bias can be adjusted by means of the screw 119 and the nut 120. A rod 121 is situated between the tensioning spring 118 and the diaphragm member 115, said rod 121 transmitting the excursion of the diaphragm member 115 under the influence of the pressure differential between the lines 111 and 108/112 onto a highly conductive metal body having the form of, for example, a tongue 122. The oscillator coils 123 and a feedback coil 124 of an oscillator for generating a high frequency current are disposed outside of the fluid-filled chamber in which the tongue 122 is situated. The oscillator is more and more attenuated the farther said tongue 122 advances between the coils 123 and 124 until, finally, the energy feedback from the main coil 123 onto the feedback coil 124 is no longer adequate for maintaining an unattenuated oscillation. The rectifier amplifier following the oscillator interrrupts the operating current of the motor over a power switch as soon as a high frequency oscillation is no longer generated, the power switch switches only at a zero-axis crossing of the alternating current curve. This procedure is cyclically repeated in such close succession that the motor 125 only receives brief pulses and, consequently, transmits a lower power to the paddle wheel 104 or, respectively, 127 than its does given continuous operation.

Figure 9:
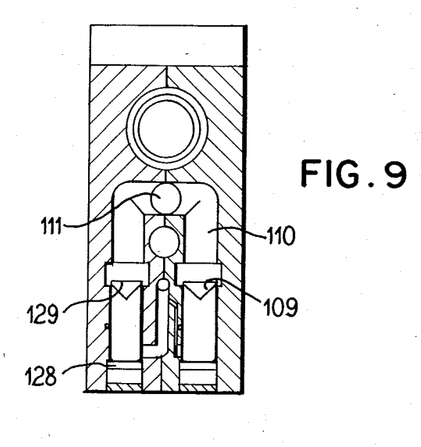
FIG. 9 shows a block diagram.

When the flow resistance through the heating element/line system is low, the motor 125 thus runs at full speed. When the pressure has risen to a pressure level that can be set by means of the screw 119, the motor is disengaged. The motor 125 runs all the more slowly at all intervening flow resistance values the higher the hydraulic resistance. The power consumption of the motor 125 thus behaves proportionally to the heat consumption of the heating system in a first approximation.

The heating system should also be operated according to the invention with a variable forward feed temperature, this being achieved in that the forward feed stream emerging from the line 111 has a part of the runback stream entering the line 112 added to it. This is inventively achieved by means of an auxiliary pump 126 that drives the impeller 127 and is connected to the discharge connector 111 over a connector 128 which contains a clack valve 129. This auxiliary pump conveys runback water through the return line 108 and the suction line 130. The quantitative ratio is inventively determined in that the motors 125 and 126 are turned on and off in cyclical succession, whereby the quantity of the mixing rate of runback water to forward feed water is determined by the pulse/pause ratio of the main pump 125. The means for shutting off the motor described with reference to the motor 125 now influences both motors, so that both motors together now convey no more water than one pump in continuous operation. Accordingly, the power consumption for the two motors 125 and 126 is again directly dependent on the water throughput through the heating element system. The clack valves 129 and 109 simultaneously serve as gravity brakes and prevent an undesired gravity circulation given disengaged motors 125 and 126, respectively.

Given reduction of the water temperature in the runback 103 below the so-called sooting temperature at which boiler corrosion begins, there is a need that a part of the forward feed water entering into the line 101 be returned so that the runback water temperature is boosted above the sooting temperature. For this purpose, the invention has provided a jet pump 131 which is disposed between the forward boiler feed line 101/107 and the system runback 112. The conveying of hot water ensues through the jet 132 which communicates with the discharge area 128 of the second pump 126. A part of the forward feed water is directly reconveyed into the boiler intake 102 in accordance with arrow 133 only when, thus, the auxiliary pump 127 is in operation and the runback water has consequently been cooled to an impermissable temperature. In order to prevent runback water from being added to the forward feed water from the intake connector 111 opposite the direction of arrow 133 when only the pump 103 is in operation, a second jet 134 which communicates with the discharge connector 106 of the pump 103 is provided. inside the jet 132. This jet 134 is significantly thinner and generates a pressure differential inside the jet pump 131 which is just high enough to reliably prevent a flow opposite the direction of arrow 133.

The need for increased operating reliability has led to the fact that more and more heating systems are equipped with so-called twin pumps, one of which respectively forms the back-up pump. The auxiliary pump 126 can be inventively employed as a back-up pump should the main pump 103 fail in that the blocking member 136 in the three-way cock 135 is pivoted from the illustrated position into the position 137 shown with broken lines. The suction region 138 of the auxiliary pump now communicates with the forward boiler feed 111 over the pipe 107.

Figure 10:
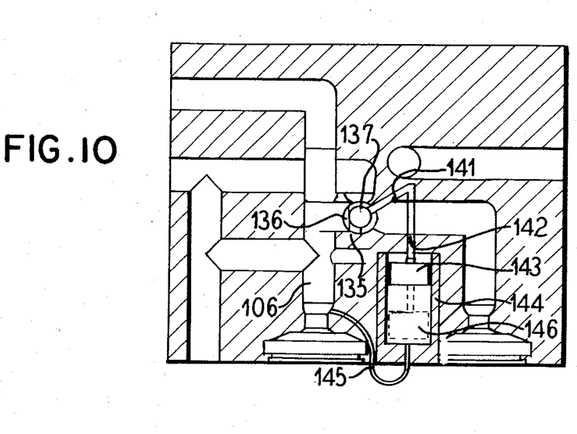
FIG. 10 shows the voltage curve given a specific circuit.

FIG. 10 shows an apparatus having the same function wherein, however, the change-over of the three-way cock 135 of FIG. 7 ensues automatically instead of manually. The three-way cock 135 is flexibly connected to a heavy piston 143 over a pivoted lever 141 and a piston rod 142. The piston slides in a downwardly closed cylinder 144 whose inside is connected over a line 145 to the pressure connector 106 of the main pump 103. The entire device 141 through 144 is situated in a chamber (not shown) that communicates with the runback channel 108. The piston descends into the position 146 shown with broken lines under its own weight as long as the main pump is switched on. The closing piece 136 is thus pivoted into the position 137. As soon as the main pump 103 is switched on, the pressure in the pressure connector 106 effects a lifting of the piston over the line 115 and, thus, a pivot of the closure piece into the position 136. Given an outage of the main pump 103, this displacement does not occur. The auxiliary pump than accordingly becomes the main pump.

Although various minor changes and modifications might be proposed by those skilled in the art, it will be understood that we wish to include within the claims of the patent warranted hereon all such changes and modifications as reasonably come within our contribution to the art.

We claim as our invention:

1. In a circulating pump heating system having an electric motor driven circulating pump for a heating means utilizing a thermal carrier medium, and a means being provided for reducing power consumption of the motor, wherein the improvement comprises: means for periodic interruption of line voltage feed to the motor by electronic switch means such that switched-on and pause intervals follow one another to slow the motor but without stopping thereof; the switch means interrupting or starting current flow while preserving full amplitude of the voltage substantially at a zero-axis crossing of the voltage of the line feed; the motor having a rotor driving a pump wheel; the motor comprising a ball motor with a magnetically seated rotor; and means controlling the periodic interruption means for sensing one of the parameters temperature or pressure associated with controlling the heating system.

2. A circulating pump system for circulating a thermal carrier medium, comprising: an electric motor connected to a drive circulating pump; thermal carrier medium distribution means driven by the circulating pump; means for reducing power consumption of the motor and yet which minimizes generation of radio frequency interference, said means including electronic switch means for switching line voltage feed to the motor so as to create switched-on and pause intervals while preserving full amplitude of the voltage, said switch means interrupting or starting current flow substantially at a zero-axis crossing of the voltage of the line feed; said electronic switch means being responsive to thermal carrier medium related system parameters; and said motor comprising a magnetically seated ball motor having a single ball abutting the rotor and with the rotor providing an axial magnetic force towards the ball.

3. In a circulating pump for heating systems driven by an a.c. motor connected to drive a paddle wheel and having a means for reducing an output of the motor, wherein the improvement comprises:

(a) electronic switch means for generating cyclical on and pause intervals in an alternating current feed voltage to the motor to provide speed reduction but without the motor stopping;

(b) said electronic switch means interrupting and reconnecting the alternating current feed voltage to the motor at a zero axis crossing of a voltage of the feed while preserving full amplitude of the feed voltage;

(c) means for providing a signal responsive to at least one of the system parameters temperature or pressure variations which forms a respective on/pause ratio such that the ratio of on time to pause time moves toward a higher on time proportion given an increasing heat power requirement; and (d) a magnetically seated ball motor having a rotor with an associated stator connected to drive the paddle wheel, an axial magnetic force being formed by the stator, said stator being separated from said rotor by an air gap and a portion of the surface of the stator and of the rotor being spherical, and said rotor being positioned by a ball.

4. A circulating pump as claimed in claim 3 wherein the rotor comprises a permanent magnetic material whose coercive field strength lies below 350 Oe.

5. A circulating pump as claimed in claim 3 wherein control of the on/pause ratio ensues via a manually actuated element.

6. A circulating pump heating system according to claim 3 wherein means are provided for producing a signal for formation of a switched-on/pause ratio which is a function of a temperature of the conveyed thermal carrier medium.

7. In a circulating pump for heating systems driven by an a.c. motor connected to drive a paddle wheel and having a means for reducing an output of the motor, wherein the improvement comprises:

(a) electronic switch means for generating cyclical on and pause intervals in a feed voltage to the motor to provide speed reduction;

(b) said electronic switch means interrupting and reconnecting the feed voltage to the motor at a zero axis crossing of the feed voltage while preserving full amplitude of the feed voltage;

(c) means for providing a signal which forms a respective on/pause ratio such that the ratio of on time to pause times moves toward a higher on time proportion given an increasing heat power output;

(d) the motor comprising a magnetically seated ball motor having a rotor with an associated stator connected to drive the paddle wheel, an axial magnetic force being formed by the stator; and (e) means being provided for producing a signal for formation of a switched-on/pause ratio which is a function of a system flow resistance in the heating means following the pump.

8. A circulating pump heating system according to claim 7 wherein said switched-on/pause ratio is related to a pressure differential between a suction side and a pressure side of the circulating pump.

9. A circulating pump heating system according to claim 8 wherein at least one heating element has a throughput of the thermal carrier medium matched to a current heat requirement via valve means controlled by room temperature; a clack valve in a circulation flow of the heat pump; means for communicating a pressure differential between an intake side and a discharge side of the clack valve with a pressure sensor; means for generating a switch-on signal as soon as a predetermined pressure differential is crossed and for generating a switch-off signal after an initial pressure value has been re-attained, so that the heat pump is only in operation during a switch-on interval whose duration is determined by a predetermined pressure interval and wherein the switch-on interval is followed by a pause interval that is longer the higher a current throttle resistance of the values in the system.

10. A circulating pump heating system according to claim 9 wherein the pressure differential is selected sufficiently low so that the pause interval given the throttle resistances predominantly prevailing during heating season is shorter than a time required for a disengaged rotor of the heat pump motor to come to a standstill.

11. A circulating pump heating system according to claim 3 wherein the switch means creates cyclical intervals having a switched-on interval duration sufficient to transmit a predetermined amount of heat to the heating system to be supplied by means of the thermal medium so that a length of the pause intervals becomes greater the lower a heat requirement of the system.

12. In a circulating pump for heating systems drive by an a.c. motor connected to drive a paddle wheel and having a means for reducing an output of the motor, wherein the improvement comprises:

(a) electronic switch means for generating cyclical on and pause intervals in a feed voltage to the motor to provide speed reduction;

(b) said electronic switch means interrupting and reconnecting the feed voltage to the motor at a zero axis crossing of the feed voltage while preserving full amplitude of the feed voltage;

(c) means for providing a signal which forms a respective on/pause ratio such that the ratio of on time to pause time moves toward a higher on time proportion given an increasing heat power output;

(d) the motor comprising a magnetically seated ball motor having a rotor with an associated stator connected to drive the paddle wheel, an axial magnetic force being formed by the stator;

(e) a main pump with an auxiliary pump which conveys water out of a runback of the heating system into a forward feed of a heat-consuming circuit; and (f) the switched-on intervals of the auxiliary pump coinciding with the pause intervals of the main pump.

13. A circulating pump heating system according to claim 12 wherein valve means for enabling a substitution of the main pump by the auxiliary pump are provided.

14. In a circulating pump for heating systems driven by an a.c. motor connected to drive paddle wheel and having a means for reducing an output of the motor, wherein the improvement comprises:

(a) electronic switch means for generating cyclical on and pause intervals in a feed voltage to the motor to provide speed reduction;

(b) said electronic switch means interrupting and reconnecting the feed voltage to the motor at a zero axis crossing of the feed voltage while preserving full amplitude of the feed voltage;

(c) means for providing a signal which forms a respective on/pause ratio such that the ratio of on time to pause time moves toward a higher on time proportion given an increasing heat power output;

(d) the motor comprising a magnetically seated ball motor having a rotor with an associated stator connected to drive the paddle wheel, an axial magnetic force being formed by the stator;
(e) a main pump with an auxiliary pump being provided which conveys water out of a runback of the heating system into a forward feed of a heat-consuming circuit;
(f) pressure sides of the two pumps being followed by clack valves via which the pumps communicate with the forward feed of the heat-consuming circuit; and
(g) a water jet blast conveying hot water from the forward feed to the runback whereby an impelling jet of the water jet blast is supplied by the auxiliary pump so that a greater or lesser proportion of hot forward feed water is added to cold runback entering through the runback as a function of a relative length of the on time of the auxiliary pump.

15. A pump motor unit system, comprising:

a pump motor having an impeller and armature rotor combined as an assembly rotatably mounted against a supporting ball;

a stator means for generating magnetic flux to exert a drive torque on the armature rotor, said stator being separated from said armature rotor by an air gap, and a portion of the armature rotor adjacent the air gap having a spherical surface and a portion of the stator adjacent said air gap having a spherical surface;

bearing means including a ball and a cap mounting said impeller and armature rotor assembly for rotation with respect to said stator;

the armature rotor of the assembly having a force applied thereto by a component of magnetic forces generated by the stator and the armature being a permanent magnet having a coercive field strength below 350 Oe; and means for periodic interruption of line voltage feed to the motor so as to reduce speed thereof by electronic switch means such that switched-on and pause intervals follow one another, and the switch means interrupting or starting current flow substantially at a zero-axis crossing of the line voltage in the line feed to the motor while preserving full amplitude of the voltage feed and wherein the periodic interruptions are such that the motor slows but does not stop during normal operating conditions.

* * * * *